United States Patent
Goss

Patent Number: 5,828,653
Date of Patent: *Oct. 27, 1998

[54] QUALITY OF SERVICE PRIORITY SUBCLASSES

[75] Inventor: Gregory S. Goss, Lowell, Mass.

[73] Assignee: Cascade Communications Corp., Westford, Mass.

[*] Notice: This patent issued on a continued prosecution application filed under 37 CFR 1.53(d), and is subject to the twenty year patent term provisions of 35 U.S.C. 154(a)(2).

[21] Appl. No.: 639,172

[22] Filed: Apr. 26, 1996

[51] Int. Cl.⁶ .................................................. H04L 12/56
[52] U.S. Cl. .......................................... 370/230; 370/412
[58] Field of Search .................................... 370/229, 230, 370/232, 233, 234, 235, 395, 409, 412, 415, 416, 417, 418, 252, 253

[56] References Cited

U.S. PATENT DOCUMENTS

| | | | |
|---|---|---|---|
| 5,233,606 | 8/1993 | Pashan et al. | 370/418 |
| 5,251,209 | 10/1993 | Jurkevich et al. | 370/468 |
| 5,278,828 | 1/1994 | Chao | 370/394 |
| 5,394,396 | 2/1995 | Yoshimura et al. | 370/236 |
| 5,434,848 | 7/1995 | Chimento, Jr. et al. | 370/232 |
| 5,546,389 | 8/1996 | Wippenbeck et al. | 370/412 |
| 5,550,843 | 8/1996 | Yee | 371/22.3 |
| 5,555,264 | 9/1996 | Sallberg | 370/414 |
| 5,570,361 | 10/1996 | Norizuki et al. | 370/395 |
| 5,583,858 | 12/1996 | Hanaoka | 370/392 |

*Primary Examiner*—Alpus H. Hsu
*Assistant Examiner*—Kwang B. Yao
*Attorney, Agent, or Firm*—Weingarten, Schurgin, Gagnebin & Hayes LLP

[57] ABSTRACT

Prioritized subclasses of cells within at least one quality of service (QoS) level in an asynchronous transfer mode (ATM) network element are described. Corresponding QoS queues are provided with one or more thresholds for intelligent discard of incoming cells within a QoS, based upon cell priority, at the onset of queue congestion. Cells having a first priority within a QoS are discarded as a first queue threshold is achieved; cells having a higher priority are enqueued. A cell loss priority (CLP) bit is employed to provide a further degree of cell discard prioritization. Different traffic streams within a single queue have different priorities, enabling intelligent discard of lower priority traffic prior to complete queue congestion.

17 Claims, 2 Drawing Sheets

| QOS QSTAT | PRIORITY 0 qos=1x00 | PRIORITY 1 qos=1x01 | PRIORITY 2 qos=1x10 | PRIORITY 3 qos=1x11 |
|---|---|---|---|---|
| FULL | DROP | DROP | DROP | DROP |
| TRIP LEVEL 4 | DROP IF CLP=1 | DROP | DROP | DROP |
| TRIP LEVEL 3 | OK | DROP IF CLP=1 | DROP | DROP |
| TRIP LEVEL 2 | OK | OK | DROP IF CLP=1 | DROP |
| TRIP LEVEL 1 | OK | OK | OK | DROP IF CLP=1 |
| TRIP LEVEL 0 | OK | OK | OK | OK |

| Queue | QoS[3:0] | Queue Status | Q_STAT[2:0] | CLP | DROP |
|---|---|---|---|---|---|
| CBR | | | | | |
| | 0000 | Level 0 | 000 | x | 0 |
| | 0000 | Full | 111 | x | 1 |
| VBR | | | | | |
| | 1x00 | Level 0 | 000 | x | 0 |
| | 1x00 | Level 1 | 001 | x | 0 |
| | 1x00 | Level 2 | 010 | x | 0 |
| | 1x00 | Level 3 | 011 | x | 0 |
| | 1x00 | Level 4 | 100 | 0 | 0 |
| | 1x00 | Level 4 | 100 | 1 | 1 |
| | 1x00 | FULL | 111 | x | 1 |
| | 1X01 | Level 0 | 000 | x | 0 |
| | 1x01 | Level 1 | 001 | x | 0 |
| | 1x01 | Level 2 | 010 | x | 0 |
| | 1x01 | Level 3 | 011 | 0 | 0 |
| | 1x01 | Level 3 | 011 | 1 | 1 |
| | 1x01 | Level 4 | 100 | x | 1 |
| | 1x01 | FULL | 111 | x | 1 |
| | 1x10 | Level 0 | 000 | x | 0 |
| | 1x10 | Level 1 | 001 | x | 0 |
| | 1x10 | Level 2 | 010 | 0 | 0 |
| | 1x10 | Level 2 | 010 | 1 | 1 |
| | 1x10 | Level 3 | 011 | x | 1 |
| | 1x10 | Level 4 | 100 | x | 1 |
| | 1x10 | FULL | 111 | x | 1 |
| | 1x11 | Level 0 | 000 | x | 0 |
| | 1x11 | Level 1 | 001 | 0 | 0 |
| | 1x11 | Level 1 | 001 | 1 | 1 |
| | 1x11 | Level 2 | 010 | x | 1 |
| | 1x11 | Level 3 | 011 | x | 1 |
| | 1x11 | Level 4 | 100 | x | 1 |
| | 1x11 | FULL | 111 | x | 1 |
| ABR | | | | | |
| | 0100 | Level 0 | 000 | x | 0 |
| | 0100 | Level 1 | 001 | 0 | 0 |
| | 0100 | Level 1 | 001 | 1 | 1 |
| | 0100 | FULL | 111 | x | 1 |

*FIG. 3*

QUALITY OF SERVICE PRIORITY SUBCLASSES

FIELD OF THE INVENTION

The invention generally relates to the field of congestion management in asychronous transfer mode (ATM) network elements, and specifically to prioritized cell subclasses within a respective quality of service level in an ATM network element.

BACKGROUND OF THE INVENTION

Within an asynchronous transfer mode (ATM) network element, such as a switch, cells are assigned to one of a number of quality of service (QoS) levels, each having associated delay and throughput characteristics, based upon the connection definition for the respective cell. Such QoS levels include: constant bit rate (CBR); variable bit rate—real time (VBR0); variable bit rate —non-real time (VBR1); available bit rate (ABR); and unspecified bit rate (UBR). A cell is mapped to a queue based upon the respective QoS definition as part of the process of reformatting the cell header and providing the cell to an appropriate output port or ports. During congestion, queues Can become full, leading to the indiscriminate discard of incoming cells.

A cell loss priority (CLP) bit associated with each cell provides some indication of whether a cell is more likely to be discarded. Initially set to zero, this bit may be reset according to network conditions and the policy of the network administrator, indicating that the associated cell is subject to being discarded by the network. However, this bit is set in an environment where discarding of incoming cells takes place in a wholesale manner when a queue is completely congested.

SUMMARY OF THE INVENTION

Cells belonging to each of plural quality of service (QoS) levels are prioritized, resulting in the creation of priority subclasses within each QoS. Correspondingly, each QoS queue is provided with one or more thresholds or trip points for intelligent discard of incoming cells within the QoS, based upon the priority of the incoming cells, at the onset of congestion within the queue. As a first threshold is achieved, cells within the QoS having a lower priority are discarded, while cells having a higher priority are assigned to the queue. In general, cells having a high priority are less likely to be discarded.

Each asynchronous transfer mode (ATM) connection is provided with a corresponding QoS and priority at switch configuration. As each cell is received within the switch, the respective connection is identified and the predefined QoS and resulting priority are assigned for use within the switch according to the present invention.

Further refinement of prioritization within a cell of a particular QoS is provided through the use of the cell loss priority (CLP) bit. A cell of a particular priority may be conditionally discardable, depending upon the value of the associated CLP bit.

Thus, different traffic streams within a single queue are allowed to have different priorities, enabling the intelligent discard of lower priority traffic upon detection of increasing queue congestion, but before the respective queue is full.

BRIEF DESCRIPTION OF THE DRAWINGS

FIG. 3 is a table illustrating a first embodiment of the prioritization of FIGS. 1 and 2.

DETAILED DESCRIPTION

Figures 1, 2:
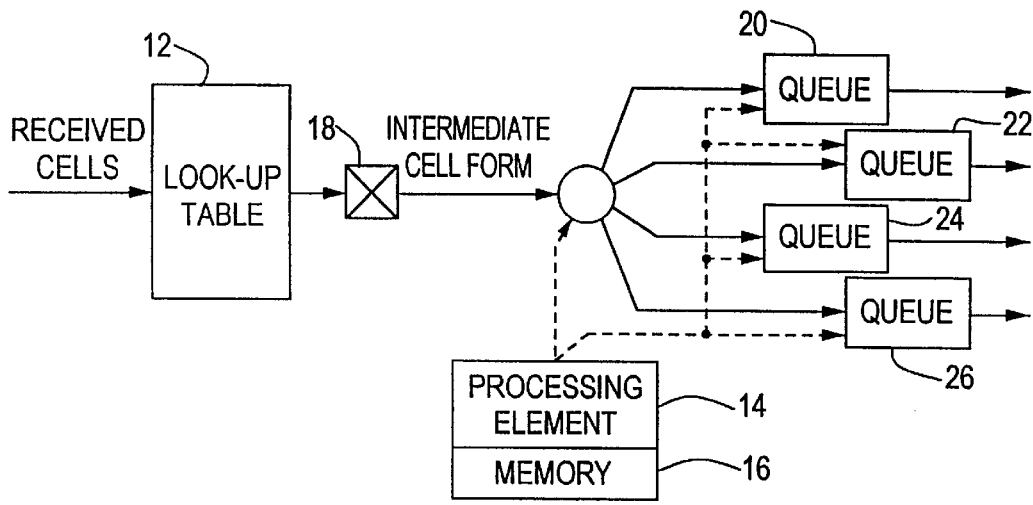
FIG. 1 is a schematic diagram of interconnected network elements implementing prioritization within multiple QoS levels according to the present invention.
FIG. 2 is a table illustrating prioritization within a quality of service (QoS) queue according to the present invention.

Cells received within an asynchronous transfer mode (ATM) network element, such as a switch, are provided with an internal header format based upon the connection defined for each incoming cell. With respect to FIG. 1, this internal header, for use in determining how each cell is to be directed through the switch and ultimately back into the ATM network, is provided by a look-up table 12 addressed by a VPI/VCI (virtual path identifier/virtual circuit identifier) pair in the received cell. Such may be accomplished through any manner known in the art or as disclosed in an application titled "ATM Address Translation Method and Apparatus" of the present assignee, filed May 26, 1996application Ser. No. 08/639,228. The internal header provides an indication of the quality of service (QoS) assigned to the respective connection of the received cell. Together, the internal header and the payload of the incoming cell form an intermediate form of the cell, which is routed through a switching fabric 18 according to the connection defined within the internal header, then mapped to a QoS queue 20, 22, 24, 26 based upon the respective QoS definition from the internal header.

In FIG. 1, a processing element 14 and associated memory 16 provide the intelligence required for analyzing the intermediate cell form and for directing the cell to the appropriate QoS queue 20, 22, 24, 26 after the cell has migrated through the switching fabric 18. In an exemplary embodiment of the present invention, the intelligence of the processing element 14 and associated memory 16 are embodied in a field programmable gate array (FPGA). Attached hereto as an Appendix is a Verilog module employed as a source for synthesizing the presently disclosed QoS subclass prioritization in such an FPGA.

The QoS field in the internal header is comprised of four bits. The upper two bits define to which of the four QoS levels the respective cell is assigned. The lower two bits are used to define one of four priorities assigned to the intermediate cell.

The memory 16 of the processing element 14, the FPGA in the exemplary embodiment, retains a table for each QoS queue 20, 22, 24, 26 correlating queue capacity with one or more thresholds or trip levels. The processing element 14 monitors the capacity of each queue 20, 22, 24, 26; as the unused capacity of each queue 20, 22, 24, 26 varies, the processing element 14 determines which of the one or more thresholds is currently achieved. At each threshold, cells of a first subclass of lower priorities are discarded, while cells of a second subclass of higher priorities are enqueued.

In FIG. 2, the foregoing table as implemented in the exemplary FPGA embodiment is illustrated. In particular, this table is for either of the two VBR QoS levels, variable bit rate—real time (qos=10xx) and variable bit rate—non-real time (qos=11xx). This is reflected by the indicated value for the first two bits of qos at the top of each column in FIG. 2: "1x".

The second two bits in the four bit QoS field represent the priority level of the intermediate cell, as illustrated across the top of the columns in FIG. 2: PRIORITY 0 (qos=1x00); PRIORITY 1 (qos=1x01); PRIORITY 2 (qos=1x10); and PRIORITY 3 (qos 1x11). In the illustrated embodiment, PRIORITY 0 has the highest priority access to the respective queue 20, 22, 24, 26, or conversely, the least likelihood of being discarded due to queue congestion.

The three bit value QSTAT reflects the monitored capacity of the respective queue. In the illustrated embodiment, five thresholds are provided as TRIP LEVEL 0 through 4. Additionally, a FULL state is provided. As the respective queue begins filling, thresholds are achieved or reached. Whether or not a cell is to be discarded as each threshold is reached depends upon the priority of the cell, as defined by the lower two QoS bits.

As an example, with regard to FIG. 2, a cell of PRIORITY 0 is waiting to be enqueued in a queue having sufficient cells to exceed TRIP LEVEL 3. This cell can be enqueued. However, a cell of PRIORITY 2, at the same queue capacity, is to be discarded. Such a cell would, however, be enqueued if the capacity were only to exceed TRIP LEVEL 1 or 0.

In an exemplary embodiment of the present invention, the queues 20, 22, 24, 26 referred to herein are output buffers each associated with a respective switch output port. Each such buffer is actually a statically defined portion of a single output port buffer. The thresholds or trip levels for each queue are predefined, based upon the respective queue size, and typically at regularly spaced intervals.

A further level of prioritization is provided in a further embodiment of the present invention, also illustrated in FIG. 2, through the use of the cell loss priority (CLP) bit. Initially set to zero, this bit provides an indication of whether a cell is more likely to be discarded if set to one. It may be set to one according to network conditions and the policy of the network administrator, indicating that the associated cell is more likely to be discarded by the network.

As an example, if an intermediate cell is of PRIORITY 0 (highest priority), and the respective queue is at capacity of TRIP LEVEL 4 (nearly a full queue), the cell is discarded if the CLP bit is set to one. Otherwise the cell is enqueued.

Once the queue becomes full, all cells are discarded regardless of priority. The present invention is clearly intended to avoid this situation by introducing intelligent discard upon initial queue congestion.

Depending upon the needs of the network element (e.g. a switch), the lower two priority bits of the QoS field can be employed differently for each QoS. FIG. 3 illustrates such a usage. CBR 100 always has the highest priority, and as a result no cells of CBR QoS are dropped unless the CBR queue is full (102).

For either of the VBR QoS levels 104, identified by QoS values of 1x00 through 1x11, the decision to discard or enqueue is governed by a decision table such as that illustrated in FIG. 2. The CLP bit is referenced only for one value of QSTAT (or Q_STAT as in FIG. 3) for each QoS and PRIORITY value. For instance, a cell 106 of QoS=1x01 (i.e. PRIORITY 1) and CLP=0 is enqueued when Q_STAT indicates TRIP LEVEL 3. Yet, under the same circumstances, a similar cell 108 having CLP=1 is discarded.

Cells 110 having ABR QoS levels are provided with two Q_STAT levels, Level 0 and Level 1, and the full state. Prioritization among ABR cells is only determined by the CLP bit when Q_STAT=Level 1 (112).

Discarding, in an exemplary embodiment of the foregoing, means that the port selection signals for the respective cell are cleared, or zeroed by applying a port bit mask from a port bit mask generator of null, or zero, value. This causes the cell to not be forwarded to any of the output ports. Upon such discarding, a flag is set and registers associated with the processing element 14 counting dropped cells are incremented. Diagnostic routines can be implemented employing such register results.

Having described preferred embodiments of the invention, it will be apparent to those skilled in the art that other embodiments incorporating the concepts may be used.

The processing element 14 and associated memory 16 can be implemented in a variety of ways, in addition to the FPGA as described above. For instance, a microprocessor can be employed to execute software modules resident in a non-volatile memory associated therewith.

The header of the intermediate cell can be implemented in a variety of ways, though it must convey at least QoS and CLP.

In a further embodiment of the present invention, the size of the buffers embodying the respective QoS queues is dynamic, based upon cell traffic experienced. In this case, the thresholds or trip levels are also dynamically adjustable. The benefit of such an embodiment would be the minimization of unused buffer resources, particularly if the QoS queue sizes are programmable.

Prioritized subclasses are implemented in multiple QoS levels in an alternative embodiment, rather than just in one (VBR) as illustrated in the foregoing. Further, a number of thresholds other than four are employable. The number of bits to represent Q_STAT and QOS are adjusted in such further embodiments as appropriate.

These and other examples of the invention illustrated above are intended by way of example and the actual scope of the invention is to be limited solely by the scope and spirit of the following claims.

What is claimed is:

1. A method for prioritizing cells of a common quality of service for prioritized entry into a queue of an asynchronous transfer mode network element, said queue being one of plural queues, each for indicating where, in a common buffer, cells of a respective quality of service are stored, the method comprising, with respect to each cell, the steps of:

receiving, by a processing element associated with said network element, a cell having a header portion;

identifying, by said processing element, a quality of service indicator for said cell from said cell header portion;

identifying, by said processing element, a network element queue associated with said identified quality of service;

monitoring the capacity of said identified queue by said processing element;

detecting, by said processing element, one or more queue capacity thresholds associated with said identified queue and achieved by said monitored capacity, said one or more queue capacity thresholds stored in a memory unit associated with said processing element;

identifying, by said processing element, a priority assignment of said cell from said cell header portion; and determining by said processing element, whether to discard or enqueue said cell in said identified queue associated with said identified quality of service based upon a comparison of said one or more achieved queue capacity thresholds and said identified priority assignment.

2. The method according to claim 1, wherein said step of detecting includes said processing element referencing a table in said memory unit having, for each of said plural queues, entries therein for each of said one or more queue capacity thresholds, each of said entries including a queue capacity at which a respective threshold is achieved.

3. The method according to claim 2, wherein said step of determining further comprises said processing element referencing said table, in which each of said entries further includes one or more priority assignments required for enqueuing, and not discarding, a respective cell if said respective threshold is achieved.

4. The method according to claim 2, wherein said step of determining further comprises said processing element referencing said tables in which each of said entries further includes one or more priority assignments required for discarding, and not enqueuing, a respective cell if said respective threshold is achieved.

5. The method according to claim 1, wherein said step of identifying a priority assignment further comprises analyzing a quality of service code in said cell header to determine said priority assignment.

6. The method according to claim 1, further comprising the additional step of said processing element recognizing a conditional discard indicator for said cell from said cell header portion.

7. The method according to claim 6, further comprising the additional step of processing said cell, by said processing element, by either discarding or enqueuing said cell based upon said comparison and also upon an analysis of said conditional discard indicator.

8. The method according to claim 1, further comprising the step of setting, by said processing element, a port bit mask value for a cell to zero if said cell is to be discarded.

9. An asynchronous transfer mode network element providing prioritization to received cells of a common quality of service within said network element, comprising:

a buffer for selectively storing said received cells;

plural queues within said network element, each for indicating where, in said buffer, said received cells of said common quality of service are selectively stored;

a queue monitoring element in communication with each of said queues for monitoring a respective queue capacity;

a memory unit, in communication with said queue monitoring element, for retaining a table of one or more queue capacity thresholds for each of said plural queues and a priority, associated with a received cell, required at each of said one or more thresholds for entry of said received cell into a respective queue; and a processing element, in communication with said queue monitoring element and said memory unit, for analyzing a header of said received cell to determine a quality of service associated therewith and to identify a respective queue from among said plural queues based upon said cell quality of service, analyzing said header of said received cell to determine a priority associated therewith, and comparing said queue capacity of said identified respective queue with said one or more queue capacity thresholds of said memory unit table to determine if said analyzed priority is said cell priority required for entering said received cell into said respective queue.

10. The network element according to claim 9, wherein said identified queue is associated with an output port of said network element.

11. The network element according to claim 9, wherein said queue monitoring element and said processing element are both implemented in a field programmable gate array.

12. The network element according to claim 9, wherein said memory unit table further identifies a conditional discard indicator value required of said received cell at each of said one or more thresholds for entry of said received cell into said respective queue.

13. The network element according to claim 9, wherein said processing element is further for analyzing said received cell to determine a conditional discard indicator associated therewith and to determine if said analyzed priority and said analyzed conditional discard indicator are said cell priority and said conditional discard indicator value, respectively, required for entering said received cell into said respective queue.

14. The network element according to claim 9, wherein said table retained in said memory unit is dynamically adjustable based upon said monitored queue capacities.

15. The network element according to claim 9, further comprising a port bit mask value generator in communication with said processing element for assigning a port bit mask value to said received cell after said processing element has determined if said analyzed priority is said cell priority required for entering said received cell into said respective queue.

16. The network element according to claim 15, wherein said port bit mask value generator assigns a null port bit mask value to said received cell if said processing element determines said received cell is not to be entered into said respective queue.

17. The network element according to claim 15, wherein said port bit mask value generator assigns a port bit mask value appropriate for said respective queue if said processing element determines said received cell is to be entered into said respective queue.

* * * * *